United States Patent
Beukema et al.

(10) Patent No.: US 8,135,100 B2
(45) Date of Patent: Mar. 13, 2012

(54) ADAPTIVE CLOCK AND EQUALIZATION CONTROL SYSTEMS AND METHODS FOR DATA RECEIVERS IN COMMUNICATIONS SYSTEMS

(75) Inventors: Troy James Beukema, Briarcliff Manor, NY (US); William Richard Kelly, Verbank, NY (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 12/194,571

(22) Filed: Aug. 20, 2008

(65) Prior Publication Data
US 2010/0046683 A1 Feb. 25, 2010

(51) Int. Cl.
*H04B 1/10* (2006.01)
(52) U.S. Cl. ......... 375/350; 375/233; 375/355; 375/357
(58) Field of Classification Search .................. 375/233, 375/350, 355, 357
See application file for complete search history.

(56) References Cited

U.S. PATENT DOCUMENTS

| | | | |
|---|---|---|---|
| 6,178,213 B1 | 1/2001 | McCormack et al. | |
| 7,616,686 B2* | 11/2009 | Aziz et al. | 375/233 |
| 2006/0109940 A1* | 5/2006 | Beukema et al. | 375/350 |

OTHER PUBLICATIONS

Beukema, T., et. al., "A 6.4Gb/s CMOS SerDes Core with FFE and DFE", IEEE Journal of Solid State Circuits, vol. 40, No. 12. Dec. 2005. Pages 2633-2645.
Bulzacchelli, J., et. al., "A 10-Gb/s 5-Tap DFE/4-Tap FFE Transceiver in 90-nm CMOS Technology", IEEE Journal of Solid State Circuits, vol. 41, No. 12. Dec. 2006. Pages 2885-2900.

* cited by examiner

*Primary Examiner* — Khanh C Tran
*Assistant Examiner* — Rahel Guarino
(74) *Attorney, Agent, or Firm* — Tutunjian & Bitetto, P.C.; Anne V. Dougherty, Esq.

(57) ABSTRACT

Systems and methods for adaptive clock and equalization control are provided for data receivers, which are based on a "closed loop" sampling clock framework that employs controllable and dynamically adapted time offsets on both local data and amplitude clocks. The controllable clock offsets are dynamically adapted using signal processing methods adapted to achieve optimum sampling of data and amplitude sampling clock signals to accurately detect data bits and optimize system equalization settings, including, decision-feedback equalizer and/or an optional linear equalizer preceding a decision-feedback equalizer.

20 Claims, 8 Drawing Sheets

ADAPTIVE CLOCK AND EQUALIZATION CONTROL SYSTEMS AND METHODS FOR DATA RECEIVERS IN COMMUNICATIONS SYSTEMS

TECHNICAL FIELD

The present invention relates generally to systems and methods for implementing adaptive clock and equalization control systems for data receivers and, in particular, adaptive clock and equalization control methods and systems that are configured to determine optimum operating points for data and equalization sense clocks to achieve optimum adaptive equalization for decision-feedback equalizer and/or linear equalizer devices in a data receiver system.

BACKGROUND

Innovations in deep-submicron CMOS technology allow integrated digital circuitry to operate at clock speeds in the gigahertz range. These high clock rates demand a corresponding increase in the speed of input/output (I/O) signals that are transmitted over interconnect lines between various IC components, such as central processing units (CPU), I/O processing units, and high-speed memory, which implement various system functions. At rates of 6 Gb/s and beyond, impairments in electrical interconnect channels for interchip communications can result in significant signal degradation, due to time dispersion, reflections, and crosstalk and other undesirable electrical phenomena, which can prohibit robust data transfer when using I/O core designs based on receive threshold comparators.

State of the art serial I/O core designs typically implement adaptive line equalization systems to eliminate or otherwise mitigate distortion of I/O signals that can occur in high-speed electrical channels. In general, a line equalizer system may use linear equalization control systems that compensate frequency dependent phase distortion and amplitude fluctuations that occur in high speed electrical channels. In other frameworks, a line equalizer system may implement non-linear equalization control methods using a decision-feedback equalizer (DFE) configured to remove data-dependent inter-symbol interference (ISI) from a received data stream and improve the performance of reliable data detection. Typically, state of the art serial I/O transceiver architectures employ a combination of transmit and/or receive linear equalizer and receive non-linear equalizer to achieve optimal system performance.

Figure 1:
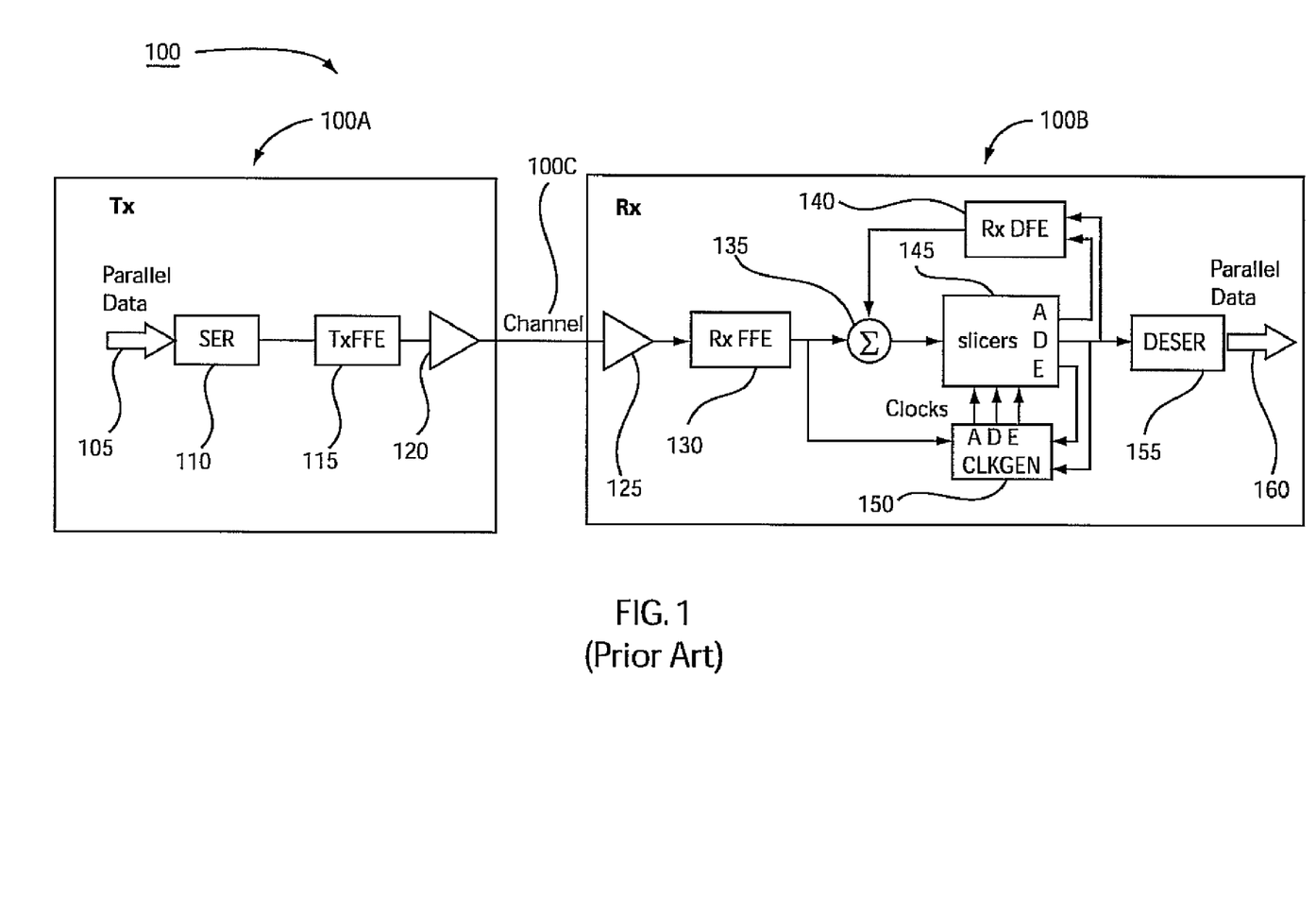
FIG. 1 is a schematic block diagram of a conventional high-speed serial link serializer/deserializer system with transmit and receive line equalization.

For example, FIG. 1 schematically illustrates a conventional data transceiver system that implements transmit and receive line equalization. In particular, FIG. 1 illustrates a data transceiver system (100) having a high-speed serial link serializer/deserializer system (SERDES) commonly used for high speed I/O system designs. The data transceiver system (100) comprises a data transmitter (100A) and a data receiver (100B), wherein the transmitter (100A) transmits serial data to the receiver (100B) over a communications channel (100C). In general, the transmitter (100A) includes a serializer block (110) to serialize an input parallel data block (105), a feed-forward equalizer (FFE) (115) to pre-distort the serial data, and a buffer/amplifier (120) to drive the communications channel (100C) and output the serialized data stream to the receiver (100B). The transmitter (100A) transmits serial data to the receiver (100B) over the communications channel (100C) at a much higher rate than a core clock that generates the parallel data streams (105) (which clock rate is typically 8, 10, or 16 times slower than the serial bus data rate).

The receiver (100B) generally includes an input buffer/amplifier (125) which buffers and amplifies a received serial data stream, a feed-forward equalizer (130), a summing block (135), a decision-feedback equalizer (DFE) (140), a data slicer (145), a clock generator (150), and a data de-serializer (155) that outputs a parallel data stream (160). In the example diagram shown in FIG. 1, the clock generator (150) is a 3-phase clock generator that produces edge E, data D, and amplitude A clock signals to drive corresponding Edge, Data, and Amplitude slicers in the slicer circuit (145). The sampled data signal output from the Data slicer of slicer block (145) is deserialized via the DESER block (155). The E and D binary outputs of the slicers (145) are processed by clock generator (150) using adaptive time alignment designed to maintain phase coherence of the local clocks with respect to the received data, and the A and D outputs of the slicer block (145) are processed by the DFE (140) to remove distortion arising from inter-symbol interference (ISI) in the channel. Details of a FFE/DFE line equalization system for high-speed I/O designs using the architecture of FIG. 1 are well known in the art.

A key challenge with line equalization systems is to determine optimum sampling points for the local clocks and optimum settings for linear (FFE) and/or DFE equalizers. There are well-established techniques for clock recovery, using common "early-late" clock-and-data recovery, which lock an "Edge" clock to a received data waveform, and then derive a data clock from a fixed time offset (typically ½ bit) from the "Edge" clock. At higher data rates, however, systematic timing errors in the clocks may arise due to circuit variability or line characteristics, which result in non-optimum data strobe points and degrade system performance. In addition, well-established techniques exist to adapt linear and DFE equalizers using sign-sign LMS adaptation techniques, but at high serial data rates in the 6 to 12 Gb/s range, small absolute timing errors in clock distribution or data path delays result in enough systematic error to degrade system performance of prior-art designs based on fixed offset clock generation. The term "open loop" clock generation system as used herein generally refers to a system that generates sample clock phases with fixed relative time offsets.

Figure 2:
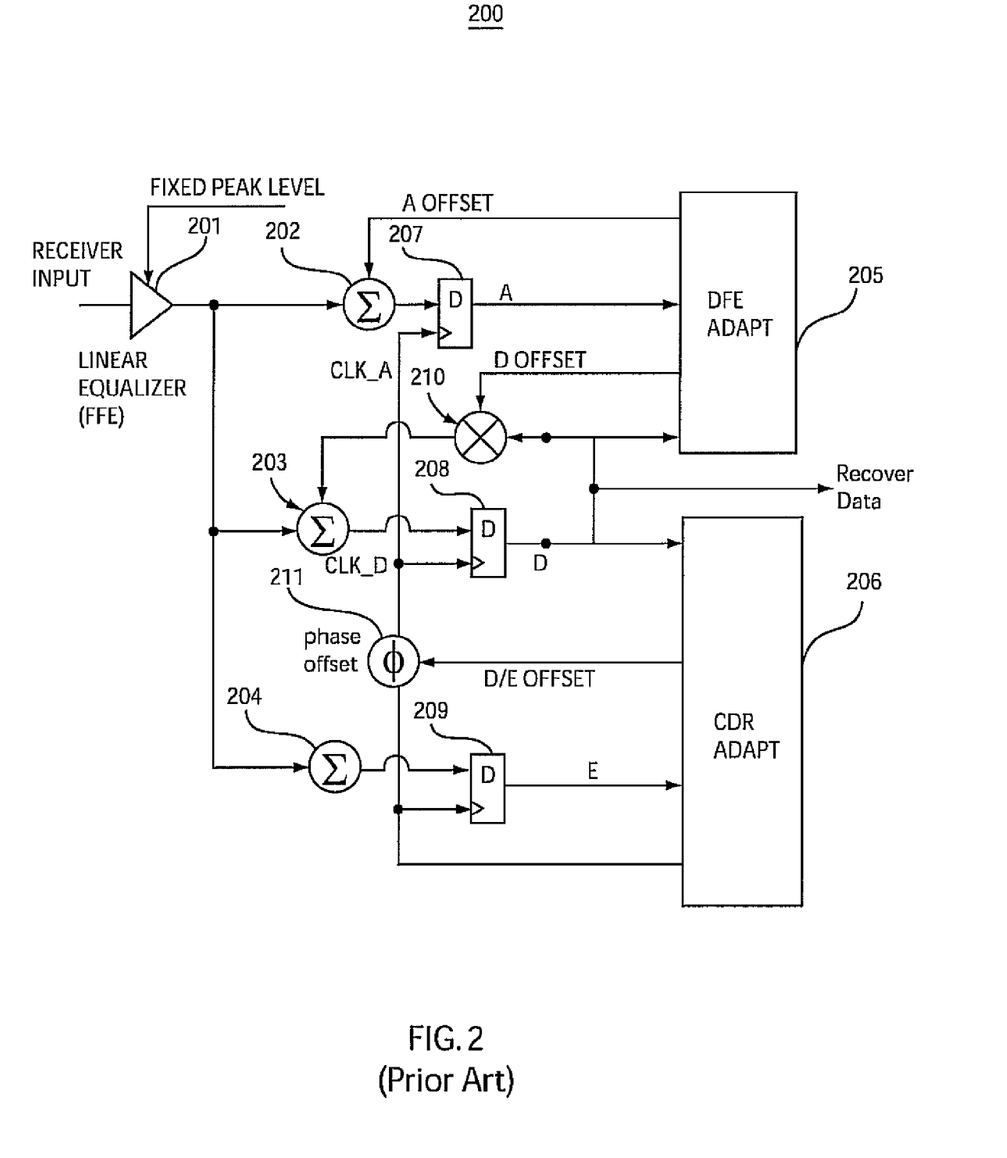
FIG. 2 is a schematic block diagram of a conventional receiver system with fixed linear equalizer and adapted DFE.

FIG. 2 schematically illustrates a conventional receiver system (200) with fixed linear equalizer and adapted DFE, which may be implemented in the receiver system (100B) of FIG. 1. FIG. 2 schematically illustrates a conventional framework of a sign-sign LMS-based adaptation system for a receiver, which employs an "open loop" clock generation system. In general, the receiver system (200) comprises a linear equalizer (201) that is controlled by a Fixed_Peak_Level control setting, summing blocks (202, 203, 204), sampling latches (207, 208, 209), a multiplier block (210), a phase offset block (211), a DFE Adapt control block (205), and a CDR (clock data recovery) Adapt control block (206). An input serial data stream is process through the front-end linear equalizer (201) with fixed peak level, and output to the summing circuits (202, 203, 204). The outputs of the summing circuits (202, 203, 204) are data inputs to respective latch circuits (207, 208, 209). The latch (209) serves to sample respective data at an edge or crossover time of the received data waveform (E sample), the latch (208) serves to sample at a data sample time (D sample) and latch (207) sample at a data sample time with a summed offset to the received waveform (A sample).

The DFE ADAPT block (205) receives as input D and A samples output from respective latches (207) and (208) to determine an A OFFSET value that is output to the summation block (202), which results in provision of a sign error (A)

capable of driving a sign-sign LMS adaptation for FFE and/or DFE equalization. In FIG. 2 a 1-tap DFE is shown which is realized by multiplying (210) an adapted D OFFSET value by a previously detected data bit D and adding (203) the result to a D path waveform for the next sample.

The clock-and-data recovery (CDR) adaptation loop (206) receives as input D and E samples from respective latches (208) and (209) and creates a CLK_E sampling clock, which is phase and frequency locked to the input data waveform. This CLK_E sampling clock is offset by a phase D/E OFFSET (211) to derive a data sample clock CLK_D and amplitude sample clock CLK_A. The D/E OFFSET signal may be computed as a variable value as a function of line equalization parameters using known methods, but since the variable value is deterministic with respect to line equalization parameters it is considered an "open-loop" clock phase generation system.

A conventional receiver system such as shown in FIG. 2 has an "open loop" sampling clock framework that uses clock signals with fixed relative phase relationships with respect to each other and with respect to an incoming data waveform. As an example, the edge clock phase in a "early-late" phase detector based system has a phase relationship equal to the median time crossing of the received signal (with a potential added systematic bias), and the data clock phase is normally fixed with respect to the edge clock phase at either a constant offset or a variable offset dependent on the receiver equalization setting.

This fixed FFE/adapted DFE system using "open loop" clocking can provide good performance for systems operating in the range of 5 to 6 Gb/s. However, as data rates approach 10 Gb/s and beyond, systematic error in the sampling time of the sampling clocks arising from circuit non-idealities and characteristics of the received waveform due to channel imperfections can result in non optimum convergence of the equalizer, in particular the first feedback tap weight of a DFE. As an illustrative example, at a data rate of 10 Gb/s, only 10 ps of systematic timing error is needed to offset the sampling clock enough to move 10% of the unit interval width. As the clock error fluctuates due to variables which are difficult to control such as device variability during manufacturing or variation due to voltage and temperature fluctuations during operation, the optimality of the data, edge, and amplitude sampling points is reduced, resulting in misconverged DFE adaptation, off-center data sampling, and overall degraded system performance. Further, a fixed linear equalizer setting prior to the DFE is not optimal for the wider range of channel gain variation, which can easily occur at higher data rates.

SUMMARY OF THE INVENTION

Exemplary embodiments of the invention generally include systems and methods for implementing adaptive clock and equalization control systems for data receivers and, in particular, adaptive clock and equalization control systems and methods configured to determine optimum operating points for data sense clock and equalization sense clocks to achieve an optimum convergence point for a decision-feedback equalizer and/or a linear equalizer which may precede a decision feedback equalizer device in a data receiver system.

Exemplary embodiments are generally based on a "closed loop" sampling clock framework that employs controllable and dynamically adapted time offsets on both local data and amplitude clocks. The controllable clock offsets are dynamically adapted using signal processing methods adapted to achieve optimum sampling of data and amplitude sampling clock signals to accurately detect data bits and optimize system equalization settings, including, decision-feedback equalizer and/or an optional linear equalizer preceding a decision-feedback equalizer.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Figure 3:
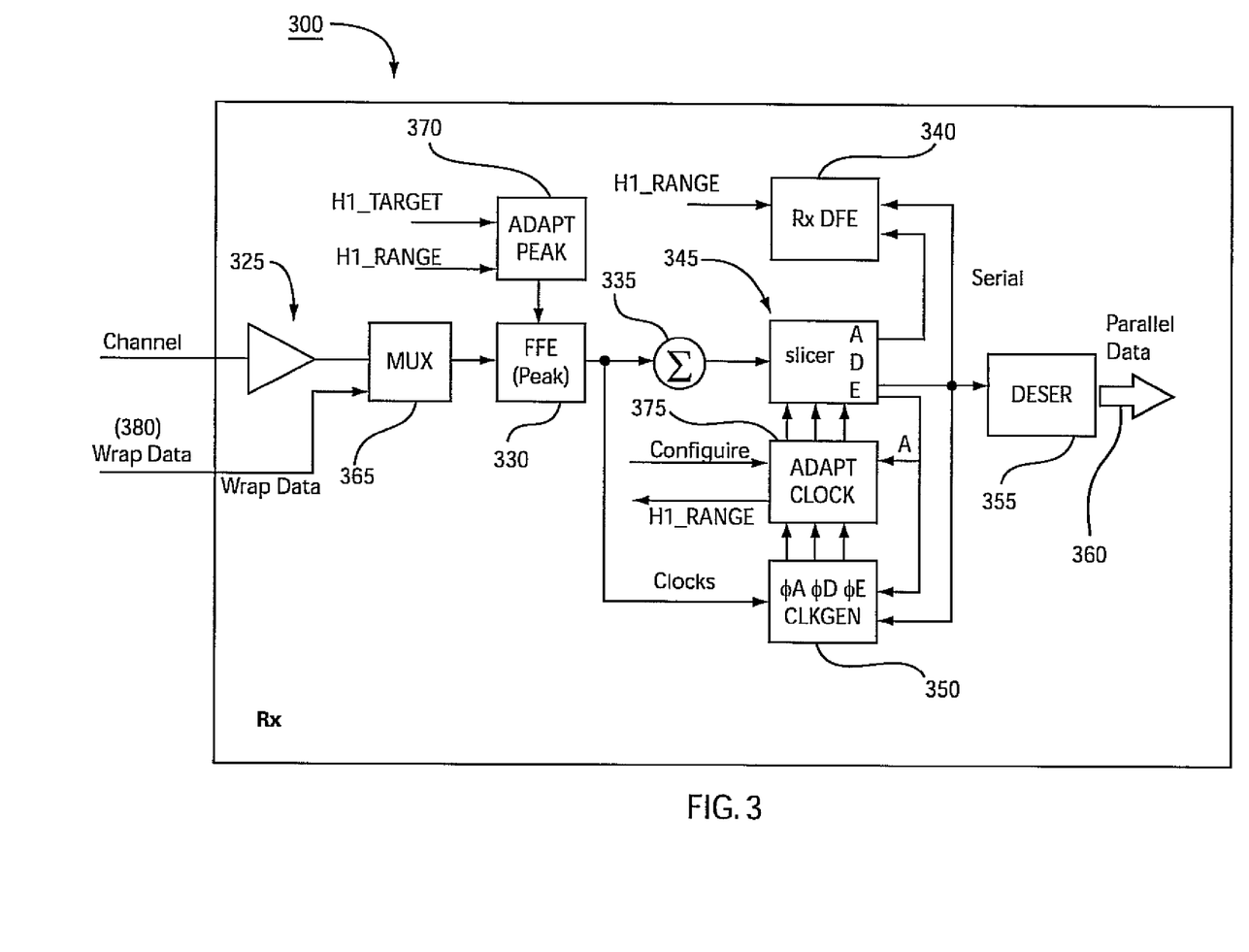
FIG. 3 is a schematic block diagram of a receiver system with dynamically adapted data and equalization sense clocks and automatic peak control, according to an exemplary embodiment of the invention.

FIG. 3 is a high-level schematic block diagram of a receiver system that provides dynamically adapted data and equalization sense clocks and automatic peak control, according to an exemplary embodiment of the invention. In particular, FIG. 3 depicts a receiver system (300) having a fundamental architecture similar to the receiver system (100b) of FIG. 1 with regard to various constituent system components, such as an input buffer/amplifier (325), a feed-forward equalizer (330), a summation circuit (335), a decision-feedback equalizer (DFF) (340), a data slicer (345), a clock generator (350) and a data deserializer (355) that outputs a parallel data stream (360).

In contrast to the receiver system (100B) of FIG. 1, the exemplary receiver system (300) of FIG. 3 further includes a multiplexer (365), a dynamic peak control module (370) and an adaptive clocking module (375), which form a closed loop sampling clock system that enables dynamic adaptation of data and equalization sense clocks and automatic peak control functions designed to achieve and maintain optimal equalization settings for high-performance operation of the receiver system.

In general, the adaptive clock module (375) implements functions such as static clock calibration alignment, dynamic data clock adjustment, dynamic amplitude clock adjustment which works in conjunction with DEE adaptation. More specifically, the adaptive clocking module (375) implements functions to independently adjust the phase of the receiver system A, D, and E sampling clocks output from the clock generation module (350) using dynamic closed-loop control algorithms designed to achieve and maintain optimum receiver performance. The adaptive clocking module (375) implements methods to support static clock alignment calibration functions to remove systematic clock offsets from the system data and amplitude clocks. The static clock alignment calibration process is performed with use of the MUX (365) and wrap data source (380) that provide wrap data that is input to the MUX (365). The wrap data source (380) may come from an adjacent receiver in a duplex core configuration, or optionally may be driven from a locally generated data source clocked by one of the three local receive clocks (amplitude, data, or edge clock).

The adaptive clocking module (375) produces an output signal, H1_RANGE, which may be used in conjunction with local adaptation of the peaking amplifier (330) in the receiver front-end. The dynamic peak control module (370) works in conjunction with the adaptive clocking module (375) to configure a peaking level of a peaking amplifier (330) to realize a dynamically adapted feed-forward equalization (FFE) function in the data receiver. As explained in further detail below, the adapt peak module (370) receives as input (i) the H1_RANGE signal output from the adaptive clocking module (375) and (ii) a user prescribed equalization target setting H1_TARGET to generate a control signal that automatically adjusts the FFE/Peaking amplifier (330) to a desired setting.

Figure 4:
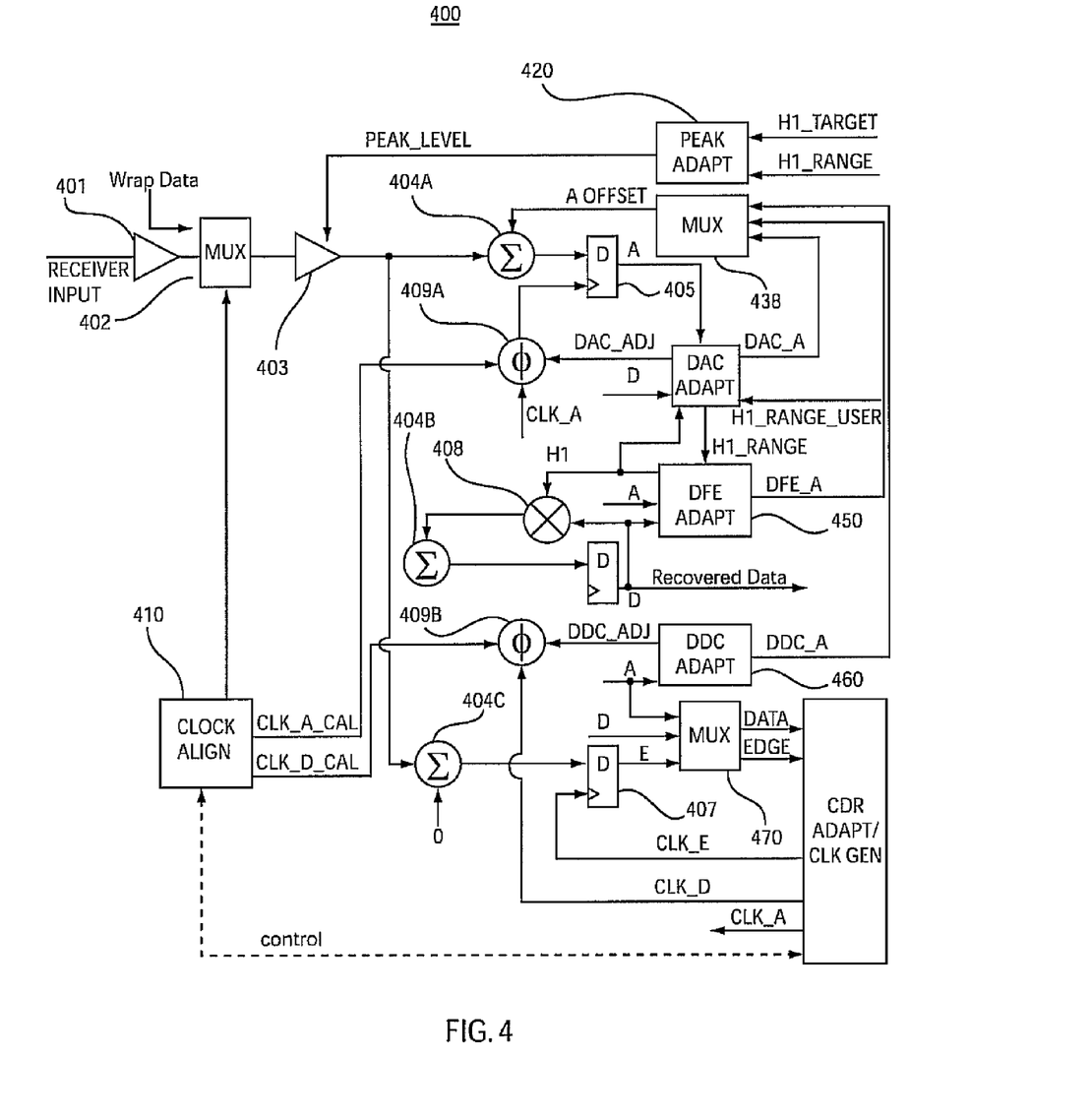
FIG. 4 is a schematic block diagram of a receiver system with dynamically adapted data and equalization sense clocks and automatic peak control according to another exemplary embodiment of the invention.

FIG. 4 is a schematic block diagram of a receiver system (400) according to another exemplary embodiment of the invention having an exemplary architecture that is based on the receiver system framework of FIG. 3 with functions to dynamically adapt data and equalization sense clocks and provide automatic peak control. In general, FIG. 4 illustrates an exemplary serial data receiver system (400) in which line equalization is generally implemented using a combination of a linear equalizer and decision-feedback equalizer. It is to be understood that some details of realization in a practical system such as ½ rate clocking architecture versus full rate clocking architecture and extended number of DFE taps beyond the first feedback tap are not specifically described in detail in FIG. 4, as these details do not affect the description and functionality of the described invention.

With reference to FIG. 4, the data receiver system (400) comprises a variable-gain amplifier (401), an input select MUX (402), a linear equalizer (403), linear summing blocks (404A, 404B, 404C), sampling latches (405-407), a multiplier block (408), phase adjust control block blocks (409A, 409B), a clock align (static calibration) block (410), a dynamic peak adapt control block (420), MUX (430), DAC (dynamic amplitude centering) control block (440), DFE control block (450), a DDC (dynamic data centering) control block (460), a MUX (470) and a CDR (clock and data recovery) and clock generation control block (490).

The VGA (401) receives and amplifies a signal that is input to the receiver system (400) at a Receiver_Input port during normal operation. The input signal may be a serial data stream that is encoded in a two-level or binary format, for example. The input select MUX (402) has input ports that are coupled to the output of the VGA (401) and to a wrap data source and an output connected to the linear equalizer block (403). As explained in further detail below, the MUX (402) is controlled to selectively output wrap data during a static calibration mode and a receiver input signal during a normal operational mode.

The linear equalizer (403) is an amplifier that provides linear feed-forward equalization to compensate frequency dependent phase distortion and amplitude fluctuations in the received input signal. The linear equalizer (403) is controlled by a control signal, Peak_Level, generated and output from the peak adapt control block (420) to dynamically adjust a peaking level of the linear amplifier (403) to an optimal setting. In one exemplary embodiment, the linear equalizer (403) may be a FFE single-stage peaking-amplifier circuit that is designed to implement a high-frequency emphasis function by capacitively de-generating a differential amplifier, such as depicted in FIG. 5.

Figure 5:
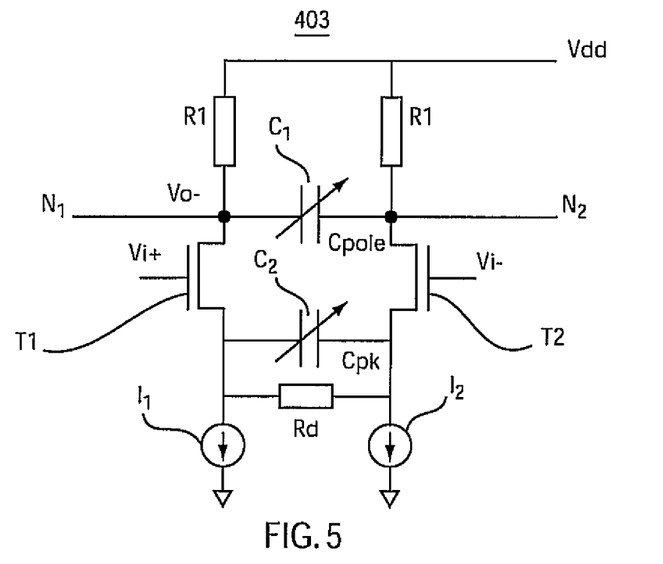
FIG. 5 is a schematic block diagram of a receiver FFE (single-stage peaking-amplifier) circuit that can be implemented in the system of FIG. 4, according to an exemplary embodiment of the invention.

In particular, FIG. 5 schematically illustrates an exemplary embodiment of the linear amplifier (403) that includes a differential transistor pair, T1 and T2, bias resistors R1, variable capacitors C1 and C2, a degenerative resistor Rd, and tail current sources I1 and I2. The high frequency emphasis level output at output at nodes N1, N2 of the amplifier is controlled primarily through the capacitance value Cpk (or pole value) of variable capacitor C1. The Cz value (or zero) can be used to control the bandwidth of the amplifier. In a preferred embodiment, the Cz value is set to a fixed setting as a function of the data rate, while the Cpk value is adapted as a function of the channel characteristics using methods/apparatus as described in further detail below.

The output of the linear equalizer (403) is coupled to the input of each summing block (404A), (404B), and (404C) at the input of respective sampling paths, including a first (amplitude) sampling path (or A path"), second (data) sampling path (or "D path") and a third (edge) sampling path (or "E path"). In the A path, the summing block (404A) adds a DC offset value, A_Offset, to the input data signal. The output of the summing block (404A) couples to the input of the sampling latch (405) (or A latch"). The A latch (405) samples the input waveform in response to amplitude clock signal CLK_A to generate a sampled signal (A) that is input to the various adapt control modules (440), (450) and (460), which generate and output respective amplitude adapt signals DAC_A, DFE_A and DDC_A to the input of the MUX (430). As explained below, the MUX (430) is selectively controlled to output one of the amplitude adapt signals DAC_A, DFE_A and DDC_A as the A_Offset signal during different stages of adaptive control during operations.

In the D path, the summing block (404B) adds a DC offset value to the input data signal. The output of the summing block (404B) couples to the input of the sampling latch (406) (or D latch"). The D latch (406) samples the input waveform in response to data clock signal CLK_D to generate a sampled signal (D) that is input to adapt control modules (440) and (450) and output as the Recovered_Data at an output port of the receiver system (400). The DC offset value input to the summing block (404B) is generated and output by the multiplier block (408) which multiplies a tap weight H1 with the D signal.

In general, the summing devices (404A) and (404B) add DC offsets to the signal to compensate data-history dependent offsets introduced by ISI in the channel. The DC offset signals are effectively computed in real time by multiplying (via multiplier 408) the sign of previously detected data (1, −1) with an adapted DC offset value or "DFE tap" magnitude representative of the level of ISI corresponding to the previously detected data bit. In FIG. 4, only a first feedback tap is shown to simplify the description, without loss of generality.

The term "H1" as used herein denotes a weight of the DC offset corresponding to the first feedback tap. In the "data" path, the output of the summer (404B) is sliced to a binary decision using the data sampling latch (406). To determine the "H1" value, a second sampling path referred to as the "amplitude" path sums both the DFE feedback offset magnitude (here "H1") and the mean received signal level at the sampling time to the output of the peaking amplifier (403). This sum is sliced to a binary decision using amplitude sampling latch (404A). The binary decision at the output of the amplitude sampling latch (405) represents sign error at the data sampling time. Using methods well-known in the art, the DFE adapt block (450) performs a sign-sign LMS adaptation by correlating the received data (D) with the sign error (A) stream to determine a converged DFE H1 offset value, which is output to a multiplier (408).

In the E path, the summing block (404C) optionally adds a DC offset to the received input signal. The output of the summing block (404C) is coupled to the input of the sampling latch (407) (or E latch). The E latch (407) samples the input waveform in response to edge clock signal CLK_E to generate a sampled signal (E) that outputs to an input port of MUX (470). The E latch (407) samples the input waveform to determine timing information from the received data waveform. The output samples (B) from the edge latch (407) are combined with the output samples (D) from data latch (406) in the CDR adapt module (480) which updates the phase of the local clocks (CLK_A, CLK_D, CLK_E) using known techniques (such as a early-late phase integration loop) to maintain both phase and frequency coherence of the local sampling clocks with respect to the incoming waveform.

As previously discussed, several problems can arise with conventional receiver systems that use "open loop" clock systems to drive the amplitude sampling latch (405) and data sampling latch (406) and that use a fixed or pre-determined sampling phase offset on the amplitude/data clocks with respect to a determined edge clock sampling phase. These problems can be channel dependent and receiver hardware dependent.

As a first specific example, in a conventional system, the CDR adapt module (480) may employ a phase lock algorithm which successfully sets the edge clock at the median point of the received data waveform transition points, but this may not represent the best setting to use as a time reference for data detection if the received waveform edge crossing distribution is not uniform and symmetric. As a second example, the optimum location of the data strobe with respect to the edge strobe can vary from channel to channel, and a fixed offset value such as ½ a bit width offset from edge to data clock may not provide an optimum data strobe point across all possible channel characteristics.

As a third example, the hardware sampling latches may exhibit different delays due to time differences in local clock distribution and effective sampling time differences due to some latches (Edge and Amplitude) operating in their "metastable" region (where "metastable" here means that the latch has an input level at sampling time smaller in amplitude than the level required for it to reliably generate a binary 1 or 0 output) while the data latch is operated in a non-metastable region (here, non-metastable means the latch has a sufficient input level for it to reliably generate a binary 1 or 0 output).

With conventional methods, all of these sources of error can produce an undesirable time bias in the sampling clocks, resulting in degraded system performance. Moreover, an undesirable time bias in the amplitude sampling clock CLK_A can result in a non-optimum DFE tap weight (H1) convergence, and undesirable time bias in the data sampling clock CLK_D directly decreases the jitter-tolerance of the receiver by biasing it closer to either the rising or falling edge of the received waveform instead of optimally centered within an error free sampling zone in the data sample interval.

The above-described clock sampling bias problems are overcome using techniques according to exemplary embodiments of invention in which novel combinations of hardware apparatus and adaptive signal processing algorithms are employed as part of the receiver system architecture to detect and correct amplitude and data sampling clock bias effects and dynamically adjust a local peaking amplifier peak level in the receiver.

As will be discussed in further detail below, the various control blocks 410, 420, 430, 440, 450, 460, 470 and 480 implement various functions through a combination of hardware and signal processing software, which collectively provide an adaptive clocking and equalization control protocol that is employed as part of the receiver system architecture to detect and correct amplitude and data sampling clock bias effects and dynamically adjust a local peaking amplifier peak level in the receiver.

In general, the DDC adapt control block (460) performs a dynamic data centering process, an exemplary embodiment of which as described in further detail below with reference to FIGS. 6 and 7. In general, the DDC adapt control block (460) receives as input the A sampled signal output from the A sampling latch (405) and generates a clock phase offset control signal, DDC_ADJ, which is applied to the data sample clock, CLK_D via the phase adjust control block (409B). In addition, the DDC adapt control block (460) generates a DC offset signal, DDC_A, which is used as the DC offset to the amplitude sample latch. The offset signal DDC_A is time multiplexed with other DC offset signals DAC_A and DFE_A provided by other adaptation control blocks by MUX (430). The MUX (430) allows the amplitude sampling latch (405) to be shared between the several adaptation control blocks.

The DAC adapt control block (440) performs a dynamic amplitude centering process. An exemplary embodiment of a DAC process will be described in further detail below with reference to FIGS. 6 and 8. The DAC adapt control block (440) receives as input A sampled signal output from the A sampling latch (405) and the DFE tap weight H1_OFFSET, output from the DFE Adapt control block (450), and generates a clock phase offset control signal, DAC_ADJ, which is applied to the amplitude sample clock, CLK_A via the phase adjust control block (409A). Further, the DAC adapt control block (440) generates a control signal, H1_RANGE, which is output to the DFE Adapt control block (450). The control signal, H1_RANGE is a digital value that represents a convergence target range for the weight H1. The DAC adapt control block (440) also outputs a DC offset signal, DAC_A, which is a DC offset that is input to the summing block (404A) to provide a DC offset to the amplitude sample latch (405). The DAC_A signal is an amplitude latch offset which may take on a range of different values during operation. The DAC_A control is multiplexed (430) with other algorithms which require amplitude samples.

In general, the DFE adapt control block (450) receives as input D and A samples output from respective latches (405) and (406) to determine a DC OFFSET value, DFE_A, that is output from the MUX (430) as A_Offset to the summing block (404A) in the A path to provide a sign error (A) capable of driving a sign-sign LMS adaptation for FFE and/or DFE equalization. Moreover, the DFE adapt control block generates a H1 value that is multiplied (via multiplier block 408) by the sign of a previously detected data bit D and added (404B) to the D path waveform for the next sample.

Figure 9:
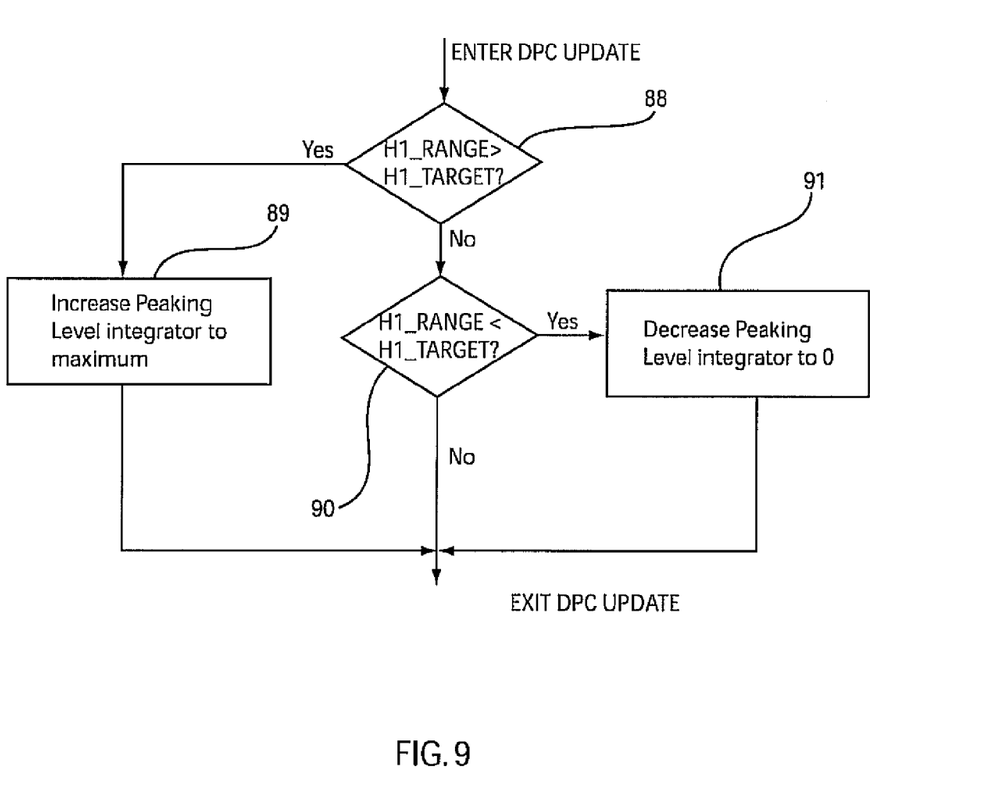
FIG. 9 is a flow diagram illustrating a dynamic peaking control process according to an exemplary embodiment of the invention.

In general, the DPC control block (420) performs a dynamic peak adapt control process. FIG. 9 is a flow diagram illustrating a dynamic peaking control process according to an exemplary embodiment of the invention. In general, the dynamic peaking control process is executed if enabled by external user control. The DPC control block (420) receives as input a digital control signal H1_RANGE determined by the DAC adapt control block (440) along with a user specified H1_TARGET value, and outputs a control signal PEAK_LEVEL value which controls the peaking level or ratio of high frequency to low frequency response of amplifier (403). The DPC control block (420) implements a process that attempts to match the H1_RANGE value to the user-specified H1_TARGET value by adjusting the peaking level of peaking-amplifier (403).

Figure 6:
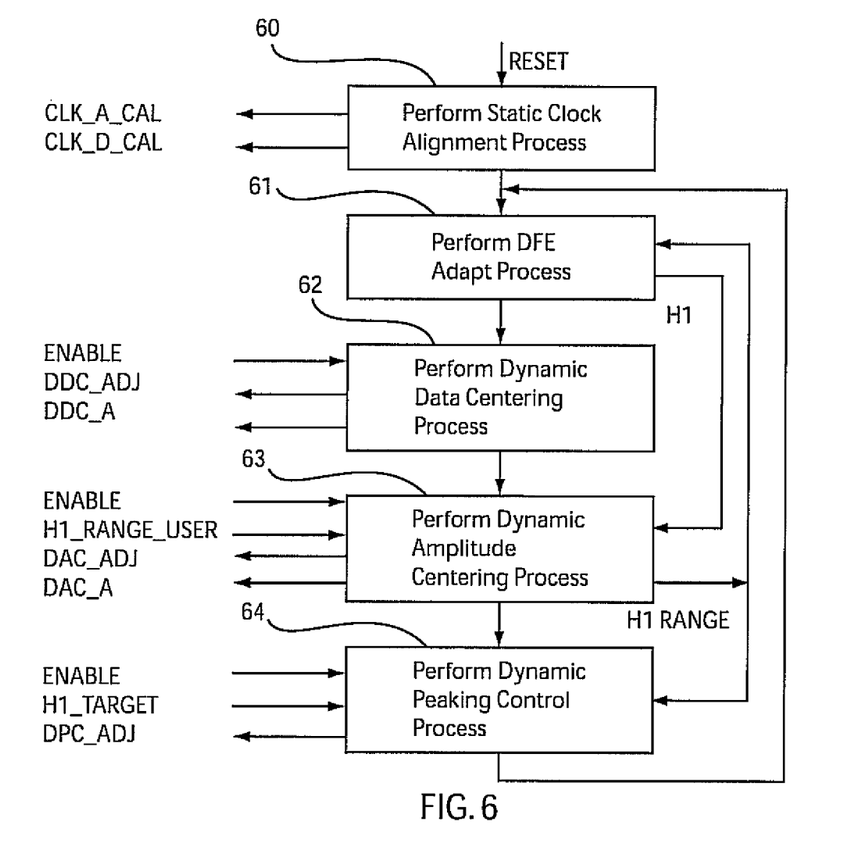
FIG. 6 is a flow diagram illustrating an adaptive clocking and equalization control process according to an exemplary embodiment of the invention.

FIG. 6 is a high-level flow diagram illustrating an adaptive clocking and equalization control process according to an exemplary embodiment of the invention. In particular, FIG. 6 illustrates an exemplary control process mode of operation of the receiver system (400) including a static clock alignment process (step (60), a DFE adapt process (61), a dynamic data centering (DDC) process (step 62), a dynamic amplitude centering (DAC) adapt process (step 63 and a dynamic peaking control (DPC) adapt process (step 64).

In general, the static clock alignment process (60) is a process performed by the clock alignment module (410) under control of the CDR Adapt and clock generator module (490) (on power-up of the receiver), to generate calibrated clock signals CLK_A_CAL and CLK_D_CAL. As explained below, the static clock alignment process (step 60) removes any systematic relative clock error between the amplitude, data, and edge clocks arising due to layout or fabrication variations. Following the static clock alignment process (step 60), the process enters a repetitive control loop process to perform DFE adaptation (step 61), dynamic data centering (step 62), dynamic amplitude centering (step 63), and dynamic peak control (step 64) in sequence, to provide a dynamic clock alignment process to fine-tune the clocks for a particular received data sequence, which can vary significantly as a function of the channel. The dynamic clock adjustment process is provided by the DFE adapt process (61), DDC process (63) and DAC process (64), to dynamically adapt in real time to the specific channel characteristics received during real time operation. The dynamic clock alignment algorithms also permit realization of a dynamic peaking control process (65) to adjust a local peaking amplifier peak level in the receiver.

The DFE Adapt process is implemented by the DFE Adapt module (450), the dynamic data centering process (step 62) is implemented using the DDC Adapt module (460), the dynamic amplitude centering process is performed by the DAC Adapt module (440) and the dynamic peak adapt process is performed by the peak adapt module (420). In FIG. 6, control and output signals for each process (60-65) are shown on the left side of the process blocks, while interprocess communication signals are shown on right side of the process description blocks. Each process will now be described in further detail.

Static Clock Alignment

The static clock alignment process (step 60) is triggered upon a system reset event, RESET, to generate calibrated clock offset values CLK_A_CAL and CLK_D_CAL. The process (60) is performed by the clock alignment module (410) under control of the CDR Adapt and clock generator module (480) to generate calibrated clock offset values CLK_A_CAL and CLK_D_CAL that are input to phase adjustment blocks (409A) and (409B), respectively. The CLK_A_CAL and CLK_D_CAL are control signals that specify an amount of phase offset that phase adjustment blocks (409A) and (409B) are to apply to CLK_A and CLK_D signals output from the clock-and-data recovery module (480) to achieve optimum static clock alignment.

The phase summing devices (409A, 409B) may be realized through any combination of digital and analog circuitry which results in the ability to control the phase of the CLK_A and CLK_D signals. Similarly, CDR adapt/CLK GEN module (480) in FIG. 4 may be realized using any combination of digital and analog circuitry which achieves provision of generated output clocks CLK_A, CLK_D, and CLK_E, each with independent phase control.

When not intentionally offset, the nominal data clock, CLK_D, and amplitude clock, CLK_A, may be aligned to the same sampling time, and the edge clock CLK_E may be ½ unit interval, or bit time, advanced from these sampling clocks. Normally, the static clock calibration process is performed after initial power-up or reset of the I/O core. To achieve calibration, the clock calibration module (410) employs the input MUX (402) to provide the receiver system (400) a locally generated synchronous data source, which may be optionally generated by multiplexing the A, D, or E clocks into a local data generator logic source, or may be obtained from another source, such as an adjacent I/O core "wrap" path with a synchronous clock which is often provided in receiver systems to realize built-in-test (BIST) functionality. In one exemplary embodiment, the calibration data source may be a short PRBS sequence such as PRBS7.

The clock alignment calibration may be achieved through the use of a conventional clock-and-data recovery (CDR) process that is capable of adjusting the offset of a clock to the median time crossing of a received data waveform sampled by the clock. In particular, in one exemplary embodiment of the invention, clock alignment is achieved by the following process:

(1) The MUX (402) is controlled to select the wrap data input such that the receiver system is connected to an internally generated data waveform source through the input MUX (402).

(2) The MUX (470) at the input of the CDR Adapt and clock generator (480) connects the Edge clock and Data output bits to a clock phase recovery algorithm in module (480), which aligns the Edge clock phase to the median edge crossing of the data waveform source and the phase of the Edge clock is saved.

(3) The A and E sampled signals are connected to a phase recovery algorithm through the MUX (470), which aligns the amplitude clock phase to the median edge crossing of the data waveform source.

(4) The difference between the amplitude clock phase found in step (3) and the edge clock phase found in step (2) is stored as an alignment offset CLK_A_CAL for the amplitude clock.

(5) The Data clock and edge output bits are connected to a clock phase recovery algorithm through the MUX (470), which aligns the data clock phase to the median edge crossing of the data waveform source.

(6) The difference between the data clock phase found in step 5 and the edge clock phase found in step 2 is stored as an alignment offset CLK_D_CAL for the data clock.

To avoid calibration bias from possible non-linearity in the phase generation circuitry of the local clocks, the phase offsets may be computed as the average phase offset determined at multiple discrete phase steps of the data source, with the discrete steps of approximately 1/16 of a bit width per step.

Effectively, the above listed steps 1 through 6 are repeated for N times, and the final CLK_A_CAL and CLK_D_CAL values are computed from the sum of the phase offset determined at each discrete phase step point divided by N. The value N is implementation dependent, but should be chosen to span the full periodicity of a local phase generator.

As a specific example, a local phase generator based on a half-rate clocking system such as that described in [2] has full periodicity in 2 bit times, so N in this case is chosen as 32 (32 steps of 1/16 bit time result in coverage of 2 bit times). Upon conclusion of the clock phase alignment procedure, the data and amplitude clocks, when adjusted by the calibration offsets, will obtain a mean phase offset of the desired M unit interval with respect to the edge clock within the accuracy of the phase offset adjustment apparatus.

Following clock alignment process (step 60), the receiver system (400) is re-configured for operating mode by controlling the MUX (402) to connect to the Receiver_Input source. Then, during operation, a continuous control process loop is activated to perform both adaptive equalization for the data path and adaptive clock alignment for the data and amplitude clocks. As shown in FIG. 6, the repetitive control loop comprises the DFE adapt process (61), a dynamic-data centering (DDC) process (step 62), a dynamic-amplitude centering (DAC) process (step 63), and a dynamic peak-control process (step 64), where each process (61)~(64) is executed in sequence through time division multiplexing the sampling hardware.

In particular, the MUX (430) (FIG. 4) is configured to control the local amplitude latch offset, A_OFFSET, by (i) the control signal (DFE_A) output from the DFE adapt control block (450) during the DPE Adapt process (step 61), (2) DDC_A control signal output from the DDC adapt control block (460) during DDC Adapt process (step 62), and by (3) the control signal DAC_A output from the DAC adapt control block (440) during DAC Adapt process (step 63). By time-division multiplexing the output (A) of the amplitude sampling latch (405) (which is input to each control block (440), (450) and (460), system power and area complexity is minimized.

DDC Adapt Control Process

As noted above, the initial static clock alignment calibration process may be performed to generate a data clock CLK_D that is nominally ½ unit intervals delayed from the edge clock CLK_E. However, the statically calibrated phase of the data clock CLK_D may not represent an optimum sampling point for the most reliable data recovery. In particular, due to channel distortion, the received waveform may be asymmetrical, and/or the median time of the edge crossing may not provide an optimum time reference to determine an optimum data sampling time. To address this timing uncertainty, the DDC adapt control block (460) performs a dynamic data centering process (step 62 FIG. 6) during runtime operation to generate a phase adjust control signal DDC_ADJ that is input to the phase adjust control block (409B) to dynamically adjust the phase offset of the data clock CLK_D.

Figure 7:
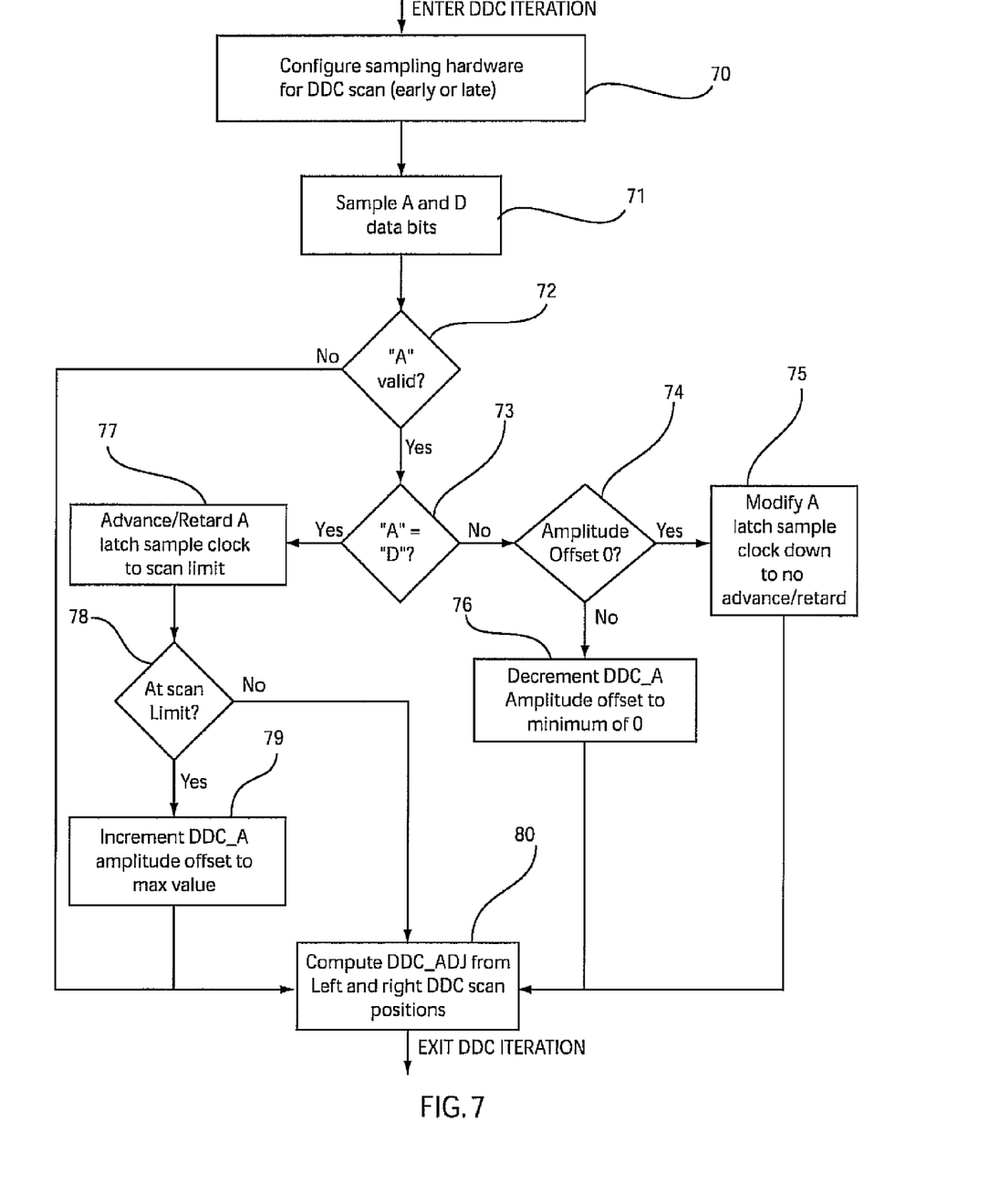
FIG. 7 is a flow diagram illustrating a dynamic data centering process according to an exemplary embodiment of the invention.

FIG. 7 is a flow diagram illustrating a dynamic data centering process according to an exemplary embodiment of the invention, which may be implemented by the DDC adapt control block (460) (FIG. 4). In general, a DDC process is based on configuring the A sampling latch (405) to mimic the D sampling latch (406) with an added DC offset (which may be zero) to the input waveform. With a summed DC offset of zero, the A sampling latch (405) will nominally decode the same output data as the D sampling latch (406), since the same waveform and clock phase is input to each of the A and D sampling latches (405) and (406). To determine an optimum phase offset for the data clock CLK_D, the amplitude clock CLK_A is alternately advanced and retarded in time until the output of the A sampling latch (405) "disagrees" with the output of the D sampling latch (406). The center of the phase interval where the output of the A sampling latch (405) "agrees" with the output of the D sampling latch (406) is determined as an optimum data sampling point for the system. To achieve this sampling point on the data clock, the phase of the data clock CLK_D is offset to achieve the centered clock point determined at the output of the A sampling latch (406). An exemplary DDC process will now be explained with reference to FIG. 7.

Referring to FIG. 7, an exemplary DDC process flow begins by configuring the sampling system for dynamic data center scanning (step 70). In one exemplary embodiment, configuration includes storing an adapted DC offset value (A_OFFSET) to the amplitude path offset, and configuring the amplitude sampling clock (405) to either an adapted early or adapted late time scan position. Following the initial configuration process, the amplitude and data bits are sampled (step 71). A determination is made as to whether the amplitude bit A is valid (step 72). If A is valid (affirmative result in step 72), a determination is made as to whether the amplitude A and data D bits agree (i.e., if A=D) (step 73). If they disagree (negative determination in step 73), the process proceeds to determine whether the amplitude offset is 0 (step 74). If the amplitude offset is 0 (affirmative determination in step 74), the A latch sample clock is modified down to no advance/retard (step 75) and the DDC_ADJ is computed from left and right DDC scan positions (step 80). If the Amplitude offset is not 0 (negative determination in step 74), then the DDC_A amplitude offset is decremented to a minimum of 0 (step 76), and DDC_ADJ is computed (step 80).

If (in step 73) the A and data D bits agree (affirmative determination in step 73), the A latch sample clock is advanced/retarded to the scan limit (step 77). If the scan limit is not reached (step 78), DDC_ADJ is computed from the left and right scan positions (step 80). If the scan limit is reached (affirmative determination step 78), DDC_A is incremented toward a maximum value (step 79) and DDC_ADJ is computed from the left and right DDC scan positions (step 80). The center of the time interval between the early and late time scan is taken as the optimum data sample position. The value DDC_ADJ is an offset which is applied to the data clock which places its sample time at the center of the early and late time scan.

When using the DDC scanning algorithm in conjunction with a DFE feedback system, consideration should be given to the fact that the amplitude level at the detection latch can change after a new data sample is latched and new DFE feedback is presented to the amplitude detection latch, while for optimum data strobe centering, the optimum data clock position should be determined based on stable DFE feedback data corresponding to the detected data bit across the full data sampling interval. In accordance with exemplary embodiments of the invention, mechanisms can be used to stabilize the DFE feedback data at the amplitude sample latch after the data sample time. For example, logic-controlled DFE feedback signs (as opposed to dynamic feedback signs from the real-time data stream) on the amplitude latch for one or more of the DFE feedback taps in combination with qualified data history can be used to validate the logic-controlled feedback signs. In addition, the DFE feedback data may be stabilized for a short time following the latch point of the data sample by virtue of delays in the response of analog circuitry to the new data sample. In this regard, an analog hold time may be sufficient in some cases to enable adequate post data sample scan time (such as ¼ a bit width) at high data rates. At lower data rates, a combination of logic-controlled DFE feedback tap signs and data history qualification may be used to stabilize the DFE feedback at the amplitude latch to enable reliable post-sample DFE mode clock scanning.

Another consideration for using DDC scanning is achieving successful transfer of the latched sample to later stages of logic, which are typically synchronized to a common clock phase optimized for data de-serialization. This transfer should operate over the full time span of the variable time scan position of the amplitude latch. To reduce the time span range of the amplitude clock, the adapted DC offset value, DDC_A, can be summed to the received data waveform input to the amplitude latch. The value DDC_A is increased if the phase advance or phase retard time offset become too large to enable the detected amplitude latch bits to be correctly transferred to later stages of logic. When a DC offset is added, an input waveform with finite rise time will have less time margin for correct data detection, enabling the time scan range to be reduced within the range that correct data transfer can be performed. The adapted DC offset therefore enables determination of an optimum data sampling point while minimizing the time scan range needed in the sampling clock system.

As noted above, a DDC process uses the phase adjust control (409A) and sampling path to perform an eye scan to locate the left and right edges of the eye. It then computes the center position at which to place the sampling clock to achieve optimal placement within the received data eye. Eye scans are performed by comparing A samples with their corresponding D samples, and adjusting the scan timing and amplitude offsets until mismatches are detected. Such mismatches indicate that the current scan offsets are on the edge of the eye. Since an objective of DDC process is to adjust the DATA sampling point to the center of the eye, it is preferable to maintain symmetry and balance between the left and right scan operations to avoid introducing artificial offsets in the computed center position. This can be achieved by starting the left and right scans from the nominal center position determined by an open loop timing adjust process, then slowly integrating the scan position of each side, based on error free intervals of a same "confidence level". Due to asymmetric scan offset limits of the analog deserializer, the limit on one edge may be reached, but not on the other before detecting any errors (if the error free interval is sufficiently wide). In order to prevent this from skewing a center computation, an amplitude offset is applied to the A sample threshold, enabling error detection within the scan limit bounds. Upon reaching a scan limit, the amplitude offset is integrated up until errors start to occur. The same A offset can be applied for scans on both early and late, regardless of which side reached its limit.

More specifically, a DDC process can start in a 1E-3 confidence mode, which determines scan boundaries at an estimated bit-error rate, or rate of difference between A and D samples at the scan boundaries, of 1E-3, to quickly locate the left and right edges of the eye. Once bit errors at 1E-3 rate are observed on both scan edges, the confidence level can be automatically changed to 1E-6 (if the 1E-6 confidence centering mode is enabled). Following this change, the A_Offset value and/or scan positions typically retreat toward the center, since the eye is not as wide to the higher confidence level. Advancement of the scan positions away from the center requires a full error accumulation interval to be error free, while detection of errors will quickly retreat the scan position. This asymmetry can become a concern if the eye changes suddenly due to a disturbance. While one edge begins to detect errors and retreat, the other edge may now be too far toward center, and will take too long (at 1E-6 confidence, which can only be realized with long measurement intervals) to relocate the edge. This must be avoided, since symmetry errors will skew the center computation, and degrade performance.

In order to address this problem, an error burst detection scheme can be used whereby a burst of errors exceeding 1E-2 confidence on either side is used to fall back to 1E-3 confidence on both sides. This ensures that both sides quickly relocate their edges while minimizing skew of the center computation. In order to avoid false triggering of retreat, a backoff scheme is employed where continued error bursts following retreat of the scan or A_Offset position by 1 step is required before retreating. After a backoff, a subsequent error free run of more than 1E3 bits will reset and re-arm the backoff logic.

More specifically, a DDC process may be implemented as follows. Starting in a 1E-3 confidence mode, both early and late error counters are reset and then used to count any errors. When both sides see at least 3 errors, the process is switched to 1E-6 confidence mode. Then both error counters are reset, and used to count errors >1E-2. If either sees error burst of 7 samples >1E-2, the process waits until that side backs off its scan position by 1 step, and then checks again for error burst. If either sees error burst of 7 samples >1E-2, after a 1 step backoff, both are switched to 1E-3 confidence mode, and the process repeats by resetting both counters.

DAC Adapt Control Process

Following execution of the DDC algorithm (step 62, FIG. 6), a dynamic clock/equalization control procedure proceeds to perform a DAC process (step 63, FIG. 6). As discussed earlier, in an adaptive equalization system, the amplitude clock/latch can be used to sense intersymbol interference arising from time dispersion in the channel. An adapted DC offset summed to the received waveform enables determination of both median signal level at a data sampling point and an associated sign-error term which may be used to drive a tap weight adaptation algorithm in an equalization system to minimize intersymbol-interference. As the data rate increases to 5 to 10 Gb/s and beyond, however, small timing offsets may arise that can result in a non-optimum equalizer convergence point. In addition, conventional adaptation systems provide limited flexibility in controlling the adaptation point, or tap weight values. In particular, constraint of the equalizer tap weight range may be desirable to either minimize decision-feedback error propagation, or increase decision-feedback level to achieve improved performance.

To address these problems, a DAC method according to an exemplary embodiment of the invention provides adaptation control based on a dynamically phase adjusted amplitude clock. A DAC control process ensures that an ISI-cancellation based adaptation system converges near an optimal setting for the channel even in the presence of unwanted timing offsets in the amplitude, or ISI sense latch, which may arise due to imperfections in analog circuitry or characteristics of the received waveform. In addition, a DAC control process provides for optional control of the peaking level of the linear equalizer (403) that precedes the receiver DFE control. An exemplary DAC adapt control process (step 63, FIG. 3) will now be described with reference to FIG. 8.

Figure 8:
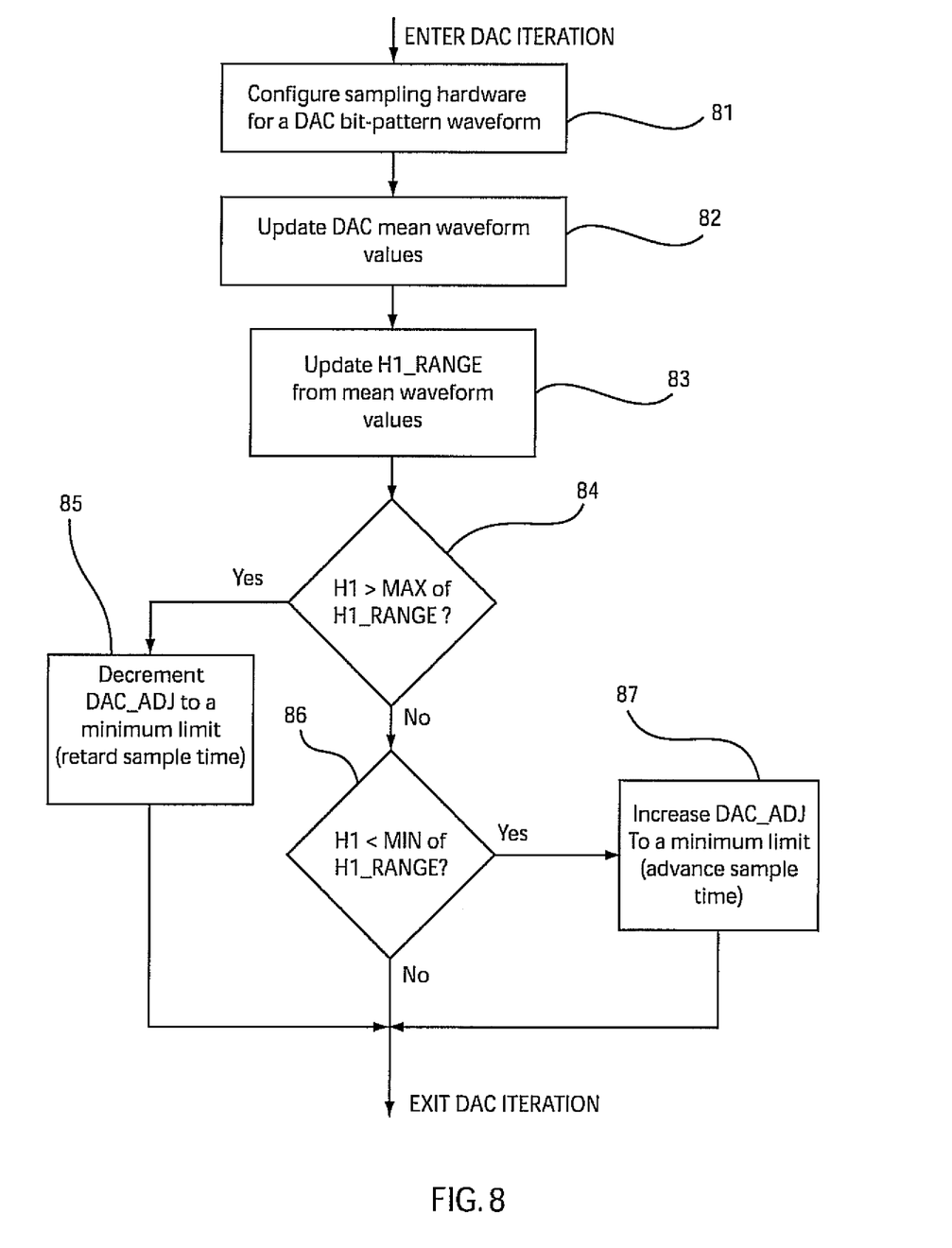
FIG. 8 is a flow diagram illustrating a dynamic amplitude centering process according to an exemplary embodiment of the invention.

In general, FIG. 8 illustrates a DAC process flow that includes an initial step which involves configuring the sample hardware to measure a DAC bit-pattern waveform (step 81), where a DAC bit-pattern waveform represents the received waveform corresponding to a transmission of particular bit sequences. A metric proportional to channel loss is determined with the amplitude latch using a method that is insensitive to small sample time errors on the amplitude clock/latch and the metric is used to compute a median waveform level for a sample point of a received data waveform (step 82). Based on the channel loss metric computed, a quantized convergence range is estimated for the first feedback tap weight of a decision-feedback equalizer (step 83). Then, the amplitude clock phase is adjusted as required until the first feedback tap of a decision-feedback equalization adaptation falls within the estimated convergence range (steps 84, 85, 86, 87).

More specifically, in one exemplary embodiment, a channel loss metric is determined using the amplitude latch system to measure the median waveform levels for particular received data patterns, which can be sensed accurately even in the presence of time offset on local clocks. For example, data patterns which may be used include a serial data sequence 010 and a serial data sequence 111. Both data sequences have an average dv/dt (rate of change of voltage with respect to time) of 0 at the center bit position. As a result, the median amplitude of the received data patterns at the center bit position can be measured with the amplitude latch in the vicinity of the center bit position even with time error on the amplitude latch clock without significantly affecting the result. These exemplary patterns are also useful to estimate high frequency channel loss in the system, since the center bit of a bit sequence of 010 will be attenuated and the center bit of a 111 bit sequence will be amplified by high frequency channel loss.

More specifically, the center bit for a received 111 data sequence will have a median value $A111=A+H(1)+H(-1)$, where "A" is the median received waveform value for all possible received bit combinations, $H(1)$ is the first feedback tap ISI at the mid bit position, $H(-1)$ is a pre-cursor ISI term, and A111 is the median level at the center bit position of a received 111 data sequence surrounded by random data. The median received waveform value for the center bit of a 010 bit pattern is given by $A010=A-H(1)-H(-1)$. In a low-loss channel, $H(1)$ and $H(-1)$ are near zero, so the ratio A010/A111 is approximately 1. In a high loss channel, $H(1)$ approaches the value of A, so the ratio A010/A111 tends toward zero. Therefore, the ratio A010/A111 can be used as a metric which varies from 0 to 1 as the channel loss varies from low to high.

The metric can be used to predict a desired convergence range for the first feedback tap of a DFE. Since the metric value is insensitive to the presence of small clock errors, the DFE adaptation system can converge to a consistent equalization target provided by the channel loss metric, with minimal impact from the amplitude and/or edge clock sampling time errors. It is to be understood that data sequences other than 010 and 111 may be used to derive an appropriate channel loss metric as long as the metric provides a monotonically increasing value as the channel loss varies from low to high and is insensitive to small timing variations in the sampling clocks.

The waveform levels at the center of the received bit patterns are determined by integrating a DC offset value at the amplitude latch until it matches the median value of the received waveform corresponding to desired bit pattern sequence. This measurement step produces results which are relatively insensitive to the exact sample latch time due to the nominal dv/dt of 0 at the center bit position for received bit-pattern sequences 010 and 111. To further reduce sensitivity to time offsets in the amplitude sense latch and/or variable signal propagation delay in the channel, the 010 sequence, for example, can be sampled at three different times: (i) one early by a fraction of the bit period (¼ of a bit period typically), (ii) one nominally on time, and (iii) one late by a fraction of the bit period. At each of these three sampling positions (early, on-time, and late) a median waveform value is computed at the sampling instant (step 82). The optimum value for the 010 mean waveform level can then be taken as the largest of the early, on-time, and late measurement.

Following determination of the median received waveform values (step 82), a "H1_TARGET" range is determined to provide an estimated optimal convergence range for the first feedback tap weight of a decision-feedback equalizer (step 83). In one exemplary embodiment, the convergence range is determined as a function median values of specific sampling positions of received bit pattern sequences. In the illustrative example, if 111 and 010 receive bit-pattern sequences are used with corresponding median waveform values at center bit position A111 and A010, respectively, then H1_RANGE is determined as a function of A010 and A111.

In an exemplary embodiment, the convergence range determination function produces 7 quantized operating ranges as follows:

H1_RANGE 1: 0 to 0.125
H1_RANGE 2: 0.125 to 0.25
H1_RANGE 3: 0.25 to 0.375
H1_RANGE 4: 0.375 to 0.5
H1_RANGE 5: 0.5 to 0.625
H1_RANGE 6: 0.625 to 0.75
H1_RANGE 7: 0.75 to 0.875

The higher operating ranges are chosen when the ratio of high frequency to low frequency channel loss is a small value (e.g. A010/A111 is small). The operating ranges shown are only illustrative examples. The specific operating ranges and method used to transform the measured bit pattern mean waveform levels to a convergence range may be selected as desired to provide optimal equalization performance for a given channel environment on an application-specific basis.

When operating in conjunction with the DAC algorithm, the decision-feedback tap weight computation is modified as follows. A determination is made as to whether the DFE H1 tap weight exceeds a maximum value of the determined H1_RANGE (step 84). If the DFE H1 tap weight determined during decision-feedback equalization adaptation does exceed the maximum H1_RANGE (affirmative determination in step 84), control DAC_ADJ is decremented toward a minimum limit (in this description, decrementing control DAC_ADJ corresponds to delaying the sample time) (step 85). In this process, the amplitude sense clock is moved to a point later in time to reduce the DFE H1 tap value until it is no longer limited by H1_RANGE. On the other hand, if the DFE H1 tap weight determined during decision-feedback equalization adaptation does not exceed the maximum H1_RANGE (negative determination in step 84), a determination is made as to whether the DFE H1 tap weight is less than a minimum H1_RANGE (step 86).

If the DFE H1 tap weight is less than the starting value of H1_RANGE (affirmative determination in step 86), the amplitude sense clock is moved to a point earlier in time to increase the tap weight until it falls within H1_RANGE (step 87). In an exemplary embodiment, the amplitude sense clock offset is adjusted a limited amount of time offset early or late (typically in the range of +−⅛ to +−¼ of a bit interval) to prohibit excess adjustment of the clock phase.

To increase the flexibility of the adaptation system, the H1_RANGE value can be directly programmed under user control, instead of being derived from the channel characteristics. This enables the user to force the DFE adaptation system to run in a certain H1 range, independently of channel characteristics. Under this operating condition, the DFE H1 value will be limited to, or bounded below, the maximum value of the user programmed H1_RANGE through logic control, but the DFE H1 value may not in general be able to achieve a value greater or equal to the smallest value of the programmed H1_RANGE due to limitations on the range of the amplitude clock offset control and/or operating channel characteristics.

DPC Adapt Control Process

Following the DAC process, the dynamic peaking control process (step 64, FIG. 6) is performed. In general, a dynamic peaking control process may or may not be executed depending on if such process is enabled/disabled by external user control. If enabled, the dynamic peak control module (420) accepts the digital control value H1_RANGE determined by the dynamic amplitude centering module (440) along with a user specified H1_TARGET value and outputs a control value which controls the peaking level or ratio of high frequency to low frequency response of peaking-amplifier (403). The DPC process attempts to match the H1_RANGE value to the user-specified H1_TARGET value by adjusting the peaking level of peaking-amplifier (403).

More specifically, FIG. 9 illustrates an exemplary process flow of a dynamic peaking control process according to an exemplary embodiment of the invention, which may be performed by the Peak Adapt module (420) in FIG. 4. Referring to FIG. 9, an exemplary DPC process includes an initial determination as to whether the H1_RANGE value computed by the DAC algorithm is larger than H1_TARGET value (step 88), If so, the peaking level is increased to lower the H1_RANGE value (step 89). If the H1_RANGE is smaller than the desired range (affirmative determination in step 90), the peaking level is decreased (step 91). When the linear equalizer is used in conjunction with DFE, a typical H1_TARGET value of 4 (H1_RANGE 0.375 to 0.5) may be used to keep the first DFE tap below a normalized value of 0.5 and minimize the DFE error propagation. When the linear equalizer is used without DFE, the desired H1_RANGE value is set to a smaller range, such as 0 to 0.125, to minimize the ISI due to channel bandwidth limitation at the data sampling latch.

The peaking control algorithm cannot guarantee that the desired H1_RANGE=H1_TARGET will be achieved since the minimum peaking level of peaking amplifier (403) may not provide a large enough H1_RANGE and the largest peaking level may not provide a small enough H1_RANGE.

In one exemplary embodiment, a peaking level integrator is employed as a filter to control the loop bandwidth or convergence speed of the control process. To stabilize the feedback control loop, the DPC control block (420) integrates the peaking level at a rate slow enough for the H_RANGE value computed by the DAC algorithm to stabilize to an updated peaking level before outputting an updated PEAK_LEVEL signal. The operation of the DPC control process is not dependent on the use of DFE, since H1_RANGE computed by the DAC algorithm does not depend on the use of DFE. Therefore, the DPC algorithm can be used in both DFE and non DFE receiver operating modes.

Although exemplary embodiments of the invention have been described herein with reference to the accompanying drawings, it is to be understood that the invention is not limited to those embodiments, and that various other changes and modifications may be effected therein by one skilled in the art without departing from the scope or spirit of the invention. All such changes and modifications are intended to be included within the scope of the invention as defined by the claims.

We claim:

1. A method for dynamically adapting a line equalization control system in a data receiver, comprising act of:
   receiving an input signal comprising a serial data stream;
   applying the input signal to a plurality of sampling paths, including an amplitude sampling path and data sampling path;
   sampling the input signal in the amplitude sampling path using an amplitude sampling clock signal CLK_A to generate an amplitude sampled signal;
   sampling the input signal in the data sampling path using a data sampling clock signal CLK_D to generate a data sampled signal;
   performing an adaptive DFE (decision-feedback equalization) process using the amplitude and data sampled signals;
   performing an adaptive clock alignment process during run-time operation of the receiver to dynamically and independently adjust phases of the data and amplitude sampling clock signals to maintain alignment of the data and amplitude clock signals based, in part, on feedback from the DFE process.

2. The method of claim 1, further comprising an act of performing a static clock calibration alignment process to initially align the data and amplitude sampling clocks using a local data source.

3. The method of claim 1, wherein performing an adaptive clock alignment process comprises dynamically and automatically adjusting the phase of the data sampling clock signal based on a determined optimal sampling phase using a replica sampling path.

4. The method of claim 3, wherein the replica sampling path is the amplitude sampling path.

5. The method of claim 4, wherein dynamically and automatically adjusting the phase of the data sampling clock signal comprises:
   alternately advancing and retarding the amplitude sampling clock signal in time to determine a phase interval where the amplitude sampled signal equals the data sampled signal; and
   determining a center of the phase interval to be an optimal data sampling point; and
   adjusting the phase of the data sampling clock signal to obtain the optimal data sampling point.

6. The method of claim 3, further comprising automatically determining a DC offset value for the replica sampling path and adding the DC offset value to the input waveform applied to the replica sampling path.

7. The method of claim 1, wherein performing an adaptive clock alignment process further comprises:
   automatically determining a quantized equalizer tap-weight convergence range for the adaptive DFE process;
   automatically adjusting the phase of the amplitude sampling clock signal until a feedback tap weight for the adaptive DFE process falls within the quantized equalizer tap-weight convergence range.

8. The method of claim 7, wherein automatically determining a quantized equalizer tap-weight convergence range for the adaptive DFE process comprises:
   determining a channel loss metric using the amplitude sampled signal output from the amplitude sample path, which metric determination is insensitive to sampling time errors due to varying channel characteristics; and
   using the channel loss metric to determine the quantized equalizer tap-weight convergence range.

9. The method of claim 7, further comprising dynamically and automatically adjusting a linear equalizer high frequency peaking level based on the quantized equalizer tap-weight convergence range.

10. The method of claim 1, further comprising dynamically adapting an equalization level of a linear equalizer using a control signal automatically generated by the adaptive clock alignment process.

11. A data receiver comprising:
an input port for receiving an input signal comprising a serial data stream;
an adaptive sampling clock system to generate a plurality of sampling clock signals, including a amplitude and data sampling clock signals, to sample the input signal applied to each of a plurality of sampling paths, including an amplitude sampling path and data sampling path to generate a data sampled signal and an amplitude sampled signal; and
an adaptive DFE (decision-feedback equalization) control system that performs a line equalization process using the amplitude and data sampled signals;
wherein the adaptive sampling clock system is adapted to perform an adaptive clock alignment process during run-time operation of the receiver to dynamically and independently adjust phases of the data and amplitude sampling clock signals to maintain alignment of the data and amplitude clock signals based, in part, on feedback from the adaptive DFE control system.

12. The receiver of claim 11, wherein the adaptive sampling clock system is adapted to perform a static clock calibration alignment process to initially align the data and amplitude sampling clocks using a local data source.

13. The receiver of claim 11, wherein the adaptive sampling clock system is adapted to dynamically and automatically adjust the phase of the data sampling clock signal based on a determined optimal sampling phase using a replica sampling path.

14. The receiver of claim 13, wherein the replica sampling path is the amplitude sampling path.

15. The receiver of claim 14, wherein the adaptive sampling clock system dynamically and automatically adjusts the phase of the data sampling clock by alternately advancing and retarding the amplitude sampling clock signal in time to determine a phase interval where the amplitude sampled signal equals the data sampled signal, determining a center of the phase interval to be an optimal data sampling point, and adjusting the phase of the data sampling clock signal to obtain the optimal data sampling point.

16. The receiver of claim 13, wherein the adaptive sampling clock system is adapted to dynamically and automatically adjust the phase of the data sampling clock by automatically determining a DC offset value for the replica sampling path and adding the DC offset value to the input waveform applied to the replica sampling path.

17. The receiver of claim 11, wherein the adaptive sampling clock system is adapted to automatically determine a quantized equalizer tap-weight convergence range for the adaptive DFE process, automatically adjust the phase of the amplitude sampling clock signal until a feedback tap weight generated by the adaptive DFE control system falls within the quantized equalizer tap-weight convergence range.

18. The receiver of claim 17, wherein the adaptive sampling clock system is adapted to automatically determine a quantized equalizer tap-weight convergence range for the adaptive DFE process by determining a channel loss metric using the amplitude sampled signal output from the amplitude sample path, which metric determination is insensitive to sampling time errors due to varying channel characteristics, and using the channel loss metric to determined the quantized equalizer tap-weight convergence range.

19. The receiver of claim 17, wherein the adaptive sampling clock system is adapted to dynamically and automatically adjust a linear equalizer high frequency peaking level based on the quantized equalizer tap-weight convergence range.

20. The receiver of claim 11, further comprising a liner feed forward equalizer coupled to the input port of the receiver, which has a dynamically adaptive equalization level that is controlled using a peak level control signal automatically generated and output from the adaptive sampling clock system.

* * * * *